(12) United States Patent
Molina, III et al.

(10) Patent No.: US 7,686,351 B2
(45) Date of Patent: Mar. 30, 2010

(54) SOFT INSERT GASKET

(75) Inventors: Vicencio Ballat Molina, III, Glen Gardner, NJ (US); Robert Scott Albro, Zionsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 194 days.

(21) Appl. No.: 11/829,150

(22) Filed: Jul. 27, 2007

(65) Prior Publication Data

US 2009/0026716 A1     Jan. 29, 2009

(51) Int. Cl.
*F16L 21/02*     (2006.01)
(52) U.S. Cl. .................. 285/354; 285/353; 285/910
(58) Field of Classification Search ......... 285/353–354, 285/384, 386–387, 910, 917
See application file for complete search history.

(56) References Cited

U.S. PATENT DOCUMENTS

| | | | | |
|---|---|---|---|---|
| 3,167,322 A | * | 1/1965 | Aichroth | 277/453 |
| 5,163,721 A | * | 11/1992 | Babuder | 285/328 |
| 5,421,594 A | * | 6/1995 | Becerra | 277/608 |
| 5,466,014 A | * | 11/1995 | Cummings | 285/92 |
| 5,758,910 A | | 6/1998 | Barber et al. | |
| 5,829,796 A | * | 11/1998 | Robinson | 285/288.1 |
| 5,887,876 A | | 3/1999 | Aldridge et al. | |
| 6,623,047 B2 | * | 9/2003 | Olechnowicz et al. | 285/328 |
| 6,695,357 B2 | * | 2/2004 | Schenk et al. | 285/355 |
| 2004/0104573 A1 | * | 6/2004 | Olechnowicz et al. | 285/328 |

FOREIGN PATENT DOCUMENTS

EP     0753696 B1     10/2001

* cited by examiner

*Primary Examiner*—Aaron M Dunwoody
*Assistant Examiner*—Fannie Kee
(74) *Attorney, Agent, or Firm*—Lina Yang

(57) ABSTRACT

Gasket comprising an inner ring having an outer surface, an outer ring having an inner surface, and an intermediate ring disposed between the inner ring and the outer ring, wherein the intermediate ring has an inner surface in contact with the outer surface of the inner ring and an outer surface in contact with the inner surface of the outer ring, and wherein the intermediate ring is made of a material that has a hardness less than the hardness of the material of each of the inner ring and the outer ring.

23 Claims, 5 Drawing Sheets

SOFT INSERT GASKET

BACKGROUND OF THE INVENTION

Static seals to connect piping portions in fluid handling systems are provided by a wide variety of sealing systems and assemblies. One of the most common seals used in piping systems is a gasket disposed between two mating surfaces or flanges, wherein each of two piping sections has a mating surface, and the mating surfaces are forced together axially against the gasket to form a seal. The axial sealing force can be provided by bolts, clamps, split rings, and threaded compression fittings. Gaskets can be fabricated from a wide range of materials including metals, polymeric elastomers, natural materials, and various combinations thereof. Numerous gasket configurations are possible such as, for example, flat sheet, ridged, grooved, spiral wound, spring finger, and toroidal ring.

In many applications, gasket seals operate for long periods of time after initial assembly, and are usually disassembled only for regular maintenance and possible replacement. In other applications, gasket seals are assembled and disassembled on a regular basis as part of ongoing operations. One such application is a gas supply operating system in which pressurized gas cylinders are connected to a piping system that delivers product gas to an end user. Empty cylinders are replaced with full cylinders on a regular basis, and each replacement step requires the disassembly and assembly of a gasket seal between the cylinder and the gas delivery piping system. The cyclic assembly and disassembly of the gasket seal can degrade the gasket and cause leaks, thereby requiring replacement of the gasket.

There is a need in fluid piping systems in general, and in compressed gas supply systems in particular, for improved gaskets that can be used in operations requiring frequent assembly and disassembly. This need is addressed by the embodiments of the present invention as described below and defined by the claims that follow.

BRIEF SUMMARY OF THE INVENTION

One embodiment of the invention relates to a gasket comprising an inner ring having an outer surface, an outer ring having an inner surface, and an intermediate ring disposed between the inner ring and the outer ring, wherein the intermediate ring has an inner surface in contact with the outer surface of the inner ring and an outer surface in contact with the inner surface of the outer ring, and wherein the intermediate ring is made of a material that has a hardness less than the hardness of the material of each of the inner ring and the outer ring.

Another embodiment of the invention includes a fluid seal assembly comprising
   (a) gasket comprising an inner ring having an outer surface, an outer ring having an inner surface, and an intermediate ring disposed between the inner ring and the outer ring, wherein the intermediate ring has an inner surface in contact with the outer surface of the inner ring and an outer surface in contact with the inner surface of the outer ring, and wherein the intermediate ring is made of a material that has a hardness less than the hardness of the material of each of the inner ring and the outer ring;
   (b) a first toroidal member having an axis, a first end, a second end axially opposite the first end, an outer surface adjacent the first end, and a face at the first end generally orthogonal to the outer surface, and;
   (c) a second toroidal member having an axis, a first end, a second end axially opposite the first end, an outer surface adjacent the first end, and a face at the first end generally orthogonal to the outer surface.

The gasket is disposed coaxially between the face of the first toroidal member and the face of the second toroidal member such that the faces of the first and second toroidal members form sealing contact with the first and second surfaces of the intermediate ring, respectively, and the intermediate ring is made of a material that has a hardness that is less than the hardness of the material of the first toroidal member and less than the hardness of the material of the second toroidal member.

In a related embodiment, the invention includes a fluid seal assembly comprising
   (a) gasket comprising an inner ring having an outer surface, an outer ring having an inner surface, and an intermediate ring disposed between the inner ring and the outer ring, wherein the intermediate ring has an inner surface in contact with the outer surface of the inner ring and an outer surface in contact with the inner surface of the outer ring, and wherein the intermediate ring is made of a material that has a hardness less than the hardness of the material of each of the inner ring and the outer ring;
   (b) a first toroidal member having an axis, a first end, a second end axially opposite the first end, an outer surface adjacent the first end, and a face at the first end that is generally orthogonal to the outer surface; and
   (c) a second toroidal member having an axis, a first end, a second end axially opposite the first end, an outer surface adjacent the first end, and a face at the first end that is generally orthogonal to the outer surface;
   wherein the intermediate ring is made of a material that has a hardness that is less than the hardness of the material of the first toroidal member and less than the hardness of the material of the second toroidal member;
   (d) a first coupling nut having an externally-threaded portion and a portion having an internal diameter greater than the external diameter of a portion of the first toroidal member adjacent the second end thereof, wherein the first coupling nut fits coaxially around the portion of the first toroidal member adjacent the second end thereof; and
   (e) a second coupling nut having an internally-threaded portion and a portion having an internal diameter greater than the external diameter of a portion of the second toroidal member adjacent the second end thereof, wherein the second coupling nut fits coaxially around the portion of the first toroidal member adjacent the second end thereof.

The gasket is disposed coaxially between the face of the first toroidal member and the face of the second toroidal member such that the faces of the first and second toroidal members are in respective sealing contact with the first and second surfaces of the intermediate ring, and the first coupling nut and the second coupling nut are adapted to be threaded together to force the faces of the first and second toroidal members against the intermediate ring of the gasket.

DETAILED DESCRIPTION OF THE INVENTION

The embodiments of the invention relate to a gasket having a ring of softer material located radially between inner and outer rings of harder rigid material adapted to minimize flow or creep of the softer material when it is compressed between the sealing faces of a fluid fitting. The gasket may be used in a threaded compression fitting, a flanged compression fitting, or any other type of fluid fitting adapted to press the faces of the fitting axially against the gasket to form a fluid-tight seal.

In the present disclosure, the term "ring" is defined as a body whose surface has the form of a toroid. The term "inner" as applied to the surface of a ring refers to the portions of the surface nearest the axis of the ring and the term "outer" refers the portions of the surface farthest from the axis of the ring. In an assembly of two or more coaxial rings, the terms "inner" and "outer" are relative terms wherein the inner ring is closer to the axis than the outer ring. The term "sealing contact" refers to the circular area of contact between a ring of gasket material and the face of a toroidal member wherein the area of contact forms a seal between the gasket and toroidal member that minimizes or prevents the leakage of a fluid across the seal in the radial direction from a higher pressure region to a lower pressure region.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

Figure 1:
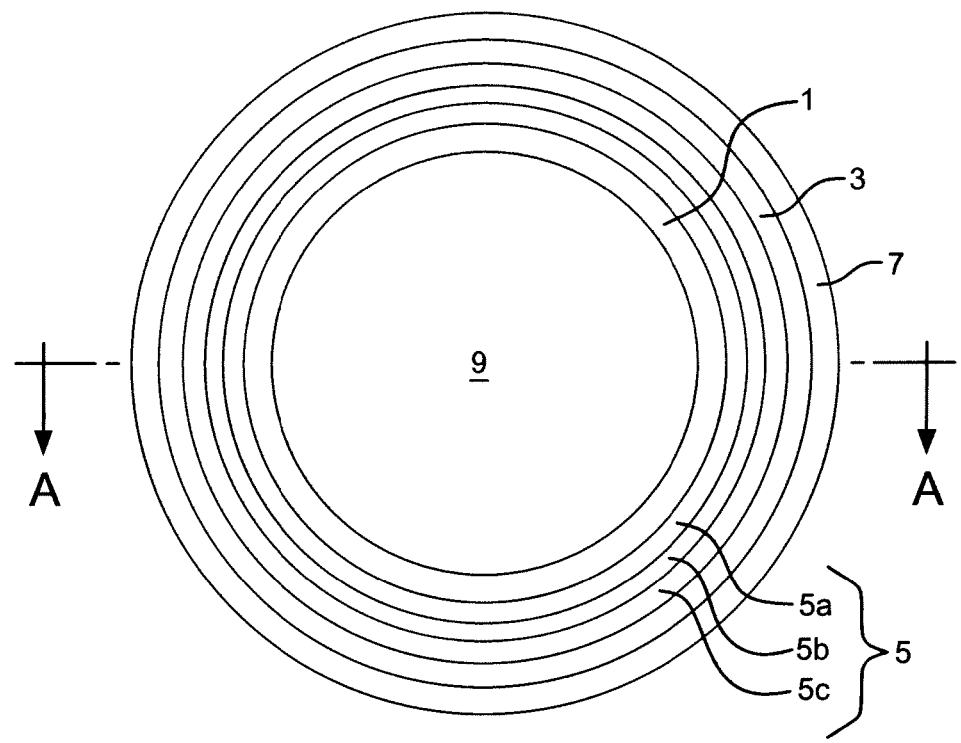
FIG. 1 is a plan view of a gasket according to an embodiment of the present invention.

An embodiment of the gasket is illustrated in FIG. 1 which is a plan view of the rings or toroidal members of the gasket assembly. Inner ring 1 is a toroid made of a rigid, hard material that is resistant to radial forces generated during assembly of a fluid fitting using the gasket as described below. Inner ring 1 has an inner surface that is defined by an inner radius, i.e., the radial distance from the axis of the gasket to the inner surface, and an outer surface that is defined by an outer radius, i.e., the radial distance from the axis of the gasket to the outer surface. Outer ring 3 is a toroid made of a rigid, hard material that is resistant to the forces, particularly radial forces, generated during assembly of a fluid fitting using the gasket as described below. Outer ring 3 has an inner surface that is defined by an inner radius, i.e., the radial distance from the axis of the gasket to the inner surface, and an outer surface that is defined by an outer radius, i.e., the radial distance from the axis of the gasket to the outer surface.

An intermediate ring is disposed between inner ring 1 and outer ring 3, and the intermediate ring has an inner surface in contact with the outer surface of the inner ring and an outer surface in contact with the inner surface of the outer ring. The intermediate ring is made of a softer material than the materials of the inner ring and the outer ring. The intermediate ring in plan view comprises three regions: an inner region 5a adjacent the inner ring, a middle region defined by optional circular groove 5b (described in more detail below), and outer region 5c adjacent outer ring 3. The entire intermediate ring having inner region 5a, optional middle region or groove 5b, and outer region 5c is described by reference numeral 5. Optional retainer ring 7 has an inner surface in contact with the outer surface of the outer ring, wherein the retainer ring has an axial length that is greater than the axial length of the outer ring as described below. The inner, intermediate, and outer rings of the gasket are coaxial with and surround central circular open area 9.

Figure 2A:
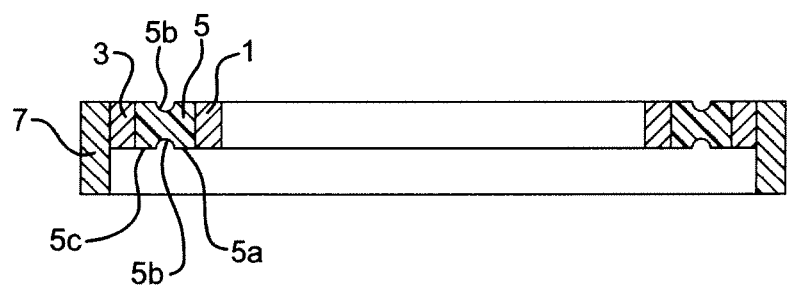
FIG. 2A, 2B, 2C or 2D is section A-A of the gasket of FIG. 1.

A view of section A-A of FIG. 1 is given in FIG. 2A showing inner ring 1, outer ring 3, and intermediate ring 5. Intermediate ring 5 may have optional circular groove 5b of any cross-sectional shape. Groove 5b is shown here formed in the bottom surface of intermediate ring 5 and a corresponding groove is shown formed in the top surface thereof. Alternatively, the groove may be formed in either the top or bottom surface thereof; in another alternative, more than one groove may be used on either or both surfaces of the intermediate ring. In yet another alternative, there are no grooves in the surfaces of intermediate ring 5.

Retainer ring 7 has an axial length that is greater than the axial length of outer ring 3, and is shown here as having one surface (shown here as an upper surface for illustration purposes only) flush with the upper surface of outer ring 3 and extending axially beyond the other surface (shown here as a lower surface for illustration purposes only) of outer ring 3. Alternatively, retainer ring 7 may be axially disposed relative to outer ring 3 so that retainer ring 7 extends axially beyond both the upper and lower surfaces of outer ring 3. An additional and smaller retainer ring (not shown) analogous to retainer ring 7 may be disposed against the inner surface of inner ring 1. In other embodiments, only an inner retainer ring or an outer retaining ring is used. The use of retainer rings is optional, and in certain embodiments, no retainer rings are used.

The radial cross-section of any of inner ring 1, outer ring 3, and optional retainer ring 7 may have the shape of a right parallelepiped as shown. The upper and lower faces of inner ring 1, outer ring 3, and optional retainer ring 7 are shown here as flat and generally orthogonal to the inner and outer surfaces of the rings. However, other ring cross-sectional shapes are possible in which any of the upper and lower faces of inner ring 1, outer ring 3, and optional retainer ring 7 are not flat. The cross-section of intermediate ring 5 is shown in FIG. 2A as having semi-circular grooves, but other cross-sectional shapes are possible depending on the location and the type of the grooves (if used).

Inner ring 1 and outer ring 3 are made of materials having a greater hardness than that of the material of intermediate ring 3. The term "hardness" as used here means a hardness parameter as defined by any of the standard material hardness tests such as, for example, the Brinell hardness (ASTM E10) or the Rockwell hardness (ASTM E18 or ISO 6508-1). Inner ring 1 and outer ring 3 may be formed of the same material or different materials, which may be metal, plastic, or composites thereof. Metals may be selected from the exemplary group consisting of carbon steel, stainless steel, brass, hastelloy, copper, inconel, nickel, silver, Monel®, and K-Monel®. Plastics may be selected from the exemplary group consisting of polyvinyl chloride (PVC), chlorinated polyvinyl chloride (CPVC), fiber reinforced plastic (FRP), Kynar®, Nylon®, Kevlar®, and Rayon®. Optional retainer ring 7 may be made of the same material used to make inner ring 1 and outer ring 3. Alternatively, the material of retainer ring 7 may be different that the materials of inner ring 1 and outer ring 3.

Intermediate ring 5 may be made of one or more of any soft polymers or elastomers available on the market. The polymers or elastomers may be selected from the exemplary group consisting of polychlorotetrafluoroethylene (for example, Kel-F®, Neoflon®, M400H®), polytetrafluoroethylene (for example, Teflon®), polyimides (for example, Vespel®), and ethylene propylene (EP). Alternatively, the ring may be a composite of two or more materials and may be, for example, a soft polymer or elastomer reinforced internally by harder and stronger materials such as fiberglass, high tensile strength polymers, or metals. In another alternative, intermediate ring 5 may comprise a relatively soft metal such as, for example, copper, aluminum, tin, zinc, lead, and alloys thereof.

Figure 2B:
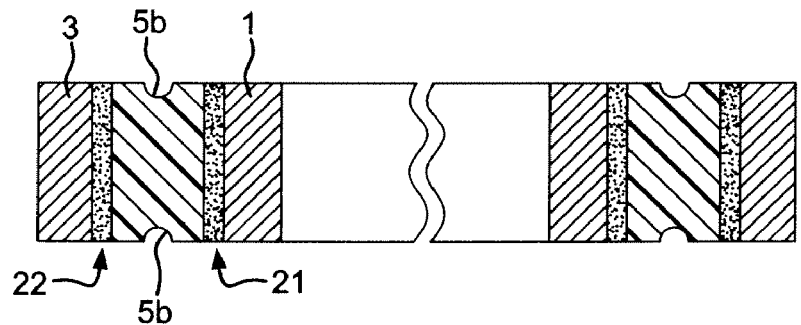

Intermediate ring 5 may be held in place between inner ring 1 and outer ring 3 by a friction fit or force fit between the inner surface of intermediate ring 5 and the outer surface of inner ring 1 and a friction fit or force fit between the outer surface of intermediate ring 5 and the inner surface of outer ring 3. The outer surface of inner ring 1 and the inner surface of outer ring 3 may be roughened to promote friction between these surfaces and the inner and outer surfaces of intermediate ring 5. Alternatively, intermediate ring 5 may held in place between inner ring 1 and outer ring 3 by an adhesive 21 (shown in FIG. 2B) between the inner surface of intermediate ring 5 and the outer surface of inner ring 1 and an adhesive 22 between the outer surface of intermediate ring 5 and the inner surface of outer ring 3. The intermediate ring also may be held in place by crimping or clamping action by bendable metal ears or tabs on the inner and outer rings.

Figure 2C:
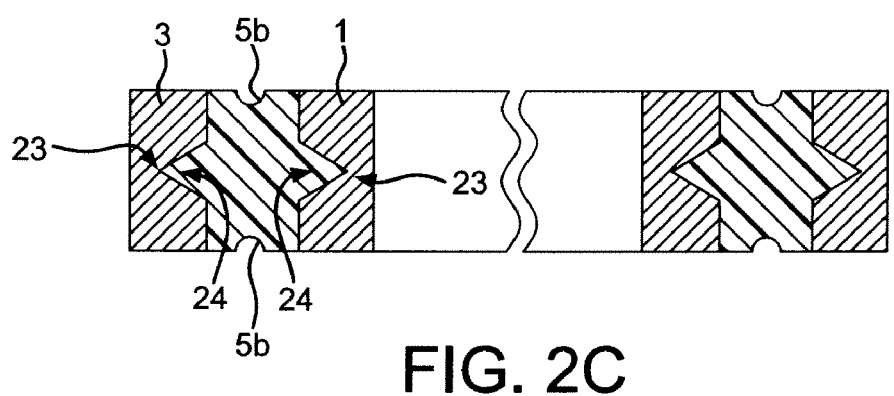

In the embodiment described above and illustrated in FIGS. 2A-2B, the outer surface of inner ring 1 and the inner surface of intermediate ring 5 are axially parallel at the contact interface between the two rings. Likewise, the inner surface of outer ring 3 and the outer surface of intermediate ring 5 are axially parallel at the contact interface between the two rings. In an alternative embodiment, as shown in FIG. 2C, the outer surface of inner ring 1 and/or the inner surface of outer ring 3 each has one or more grooves 23, and the inner and/or outer surfaces of intermediate ring 5 each have one or more raised ridges 24 adapted to mate with the grooves in the inner surface of outer ring 3 and/or the outer surface of inner ring 1, respectively. Intermediate ring 5 is made of a resilient elastomeric material and can be inserted into or mated with inner ring 1 and outer ring 3 using appropriate tools. The size and cross-sectional shapes of the grooves and mating ridges are sleeted to allow temporary deformation of intermediate ring 5 during assembly and mating of intermediate ring 5 with inner ring 1 and outer ring 3. Once assembled, the three rings are held together by the mating action of the ridges and grooves. The ridges and grooves may have any cross-sectional shape and may be, for example, rectangular, V-shaped, semi-circular, oval, trapezoidal, or any other appropriate geometric shape.

Figure 2D:
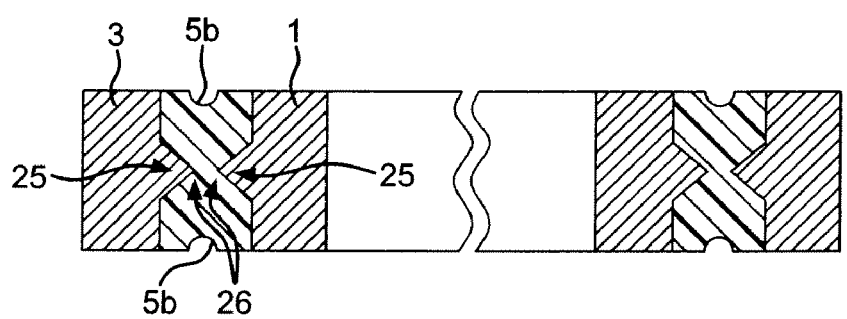

In an alternative to this embodiment as shown in FIG. 2D, the grooves 25 can be formed in the inner and/or outer surfaces of intermediate ring 5, and the ridges 26 can be formed on the outer surface of inner ring 1 and/or the inner surface of outer ring 3, respectively.

The gasket described above with reference to FIGS. 1 and 2A to 2D is used in a fluid fitting or fluid seal assembly connected to tubing or piping portions in a fluid piping system. One type of exemplary fluid seal assembly that may be used with the gasket described above is the compression fitting illustrated in FIG. 3A. The compression fitting comprises two toroidal members that clamp the gasket between generally parallel faces of the members and two threaded coupling nuts that are adapted to exert opposing axial clamping forces on the toroidal members. First toroidal member 11 has open inner bore 13 enclosed by tubing wall 15, intermediate portion 17, shoulder 19, and forward portion 21. Forward portion 21 has a face generally orthogonal to the axis and outer surface of toroidal member 11. Second toroidal member 23 has open inner bore 25 enclosed by tubing wall 27, intermediate portion 29, shoulder 31, and forward portion 33. Forward portion 33 has a face generally orthogonal to the axis and outer surface of toroidal member 23.

First coupling nut 35 has front externally-threaded portion 37 and rear portion 39 having an outer surface with hexagonal flat portions (not shown here) for mating with a wrench to apply torque to the coupling nut. The inside diameter of front portion 37 is larger than the outside diameter of intermediate portion 17, the inside diameter of rear portion 39 is larger than the outside diameter of tubing wall 15, and the outside diameter of shoulder 19 is larger than the inside diameter of front portion 37 and smaller than the inner diameter of threaded portion 37 of first coupling nut 35. The end of front portion 37 contacts the outer side of shoulder portion 19.

Second coupling nut 41 has front internally-threaded portion 43 and rear portion 45, wherein front portion 43 has an outer surface with hexagonal flat portions (not shown here) for mating with a wrench to apply torque to the coupling nut. The inside diameter of rear portion 45 is greater than the outside diameter of intermediate portion 29 and the inside diameter of front portion 43 is larger than the outside diameter of shoulder portion 31 and shoulder portion 19. The front portion of rear portion 45 contacts the outer side of shoulder portion 31.

Gasket 47 is disposed between the faces of forward portion 21 and forward portion 33. Front externally-threaded portion 37 screws into front internally-threaded portion 43, thereby exerting opposing axial forces against shoulder portion 19 and shoulder portion 31, which in turn clamps gasket 47 to form a seal on each of the gasket faces as described below.

Tubing or piping (not shown) may be connected to open inner bore 13 of first toroidal member 11 and tubing or piping (not shown) may be connected to open inner bore 25 of second toroidal member 23, thereby forming a coupling and seal between parts of a fluid handling system. Alternatively, one of open inner bores 13 or 25 may be plugged, and the plug, coupling, and seal act together to isolate a fluid storage system (not shown) connected to the other inner bore.

Figure 3A:
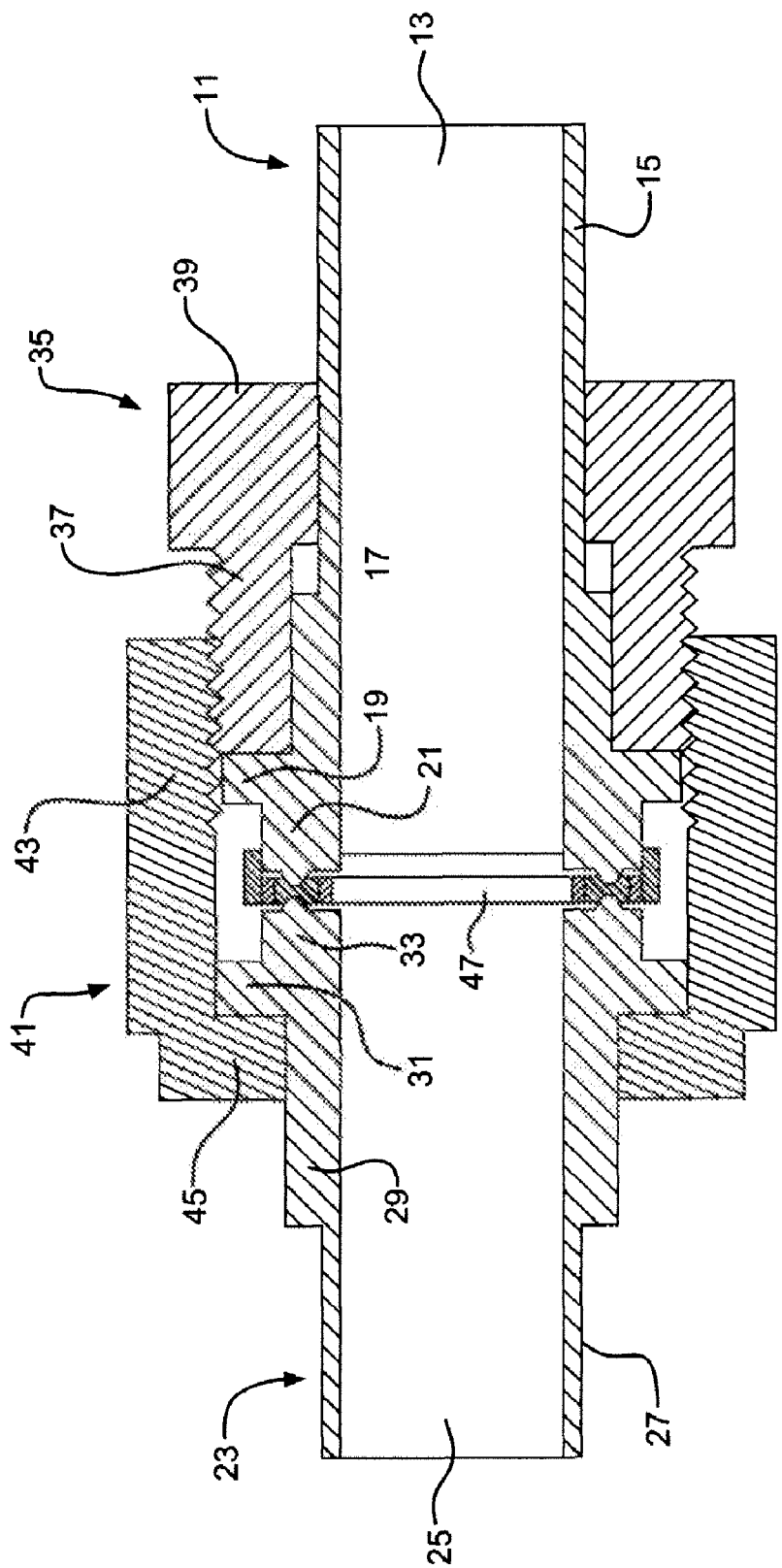
FIG. 3A or 3B is a cross-section of a compression fitting using the gasket of FIGS. 1 and 2A to 2D.
Figure 4:
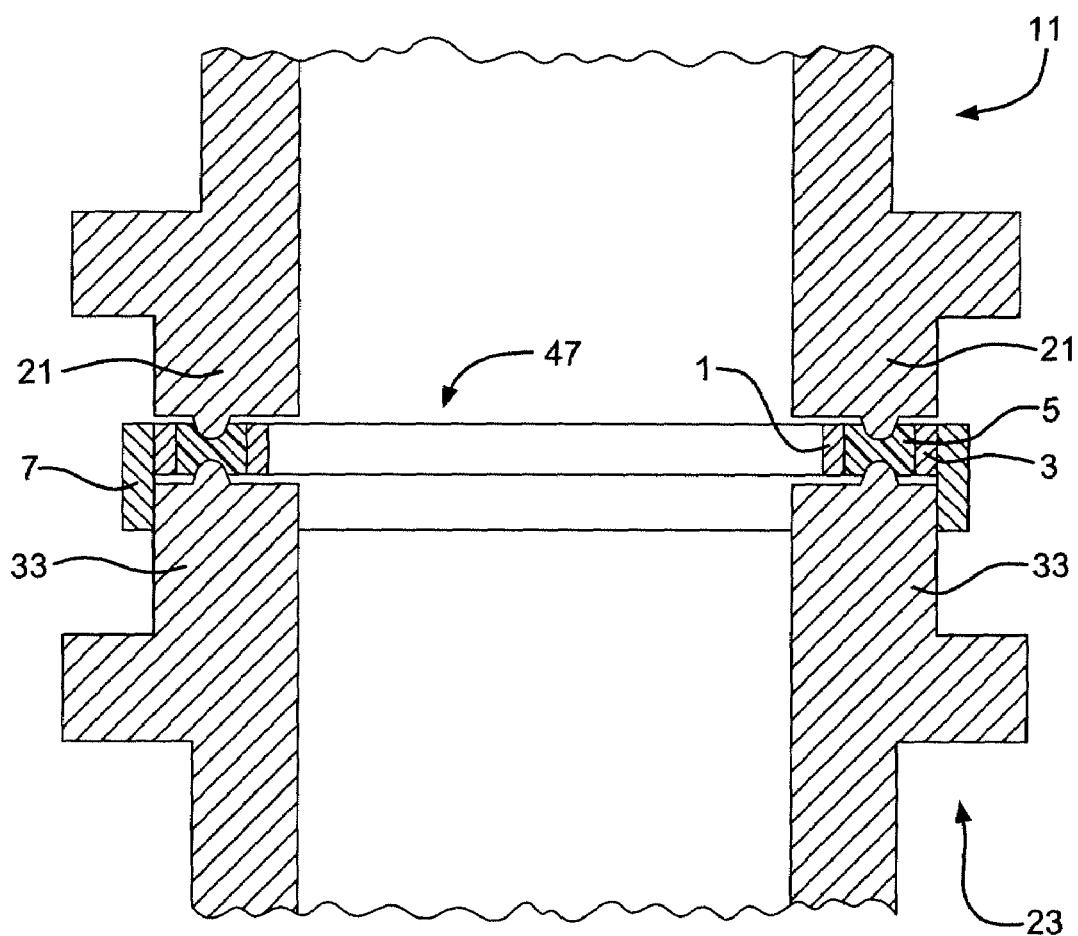
FIG. 4 is an enlarged portion of the compression fitting of FIG. 3A.

The central section of the fluid seal assembly of FIG. 3A is enlarged and shown in FIG. 4. Gasket 47, which was described above with reference to FIGS. 1 and 2A to 2D, is clamped between the faces of forward portion 21 of toroidal member 11 and forward portion 33 of toroidal member 23. Gasket 47 is located coaxially with toroidal members 11 and 23 by retaining ring 7, which fits closely around the outside diameter of forward portion 33 of toroidal member 23. In this embodiment, intermediate ring 5 has grooves of semi-circular cross-section in each face that mate with ridges having a similar cross-section on the faces of forward portions 21 and 33 of toroidal members 11 and 23, respectively. As toroidal members 11 and 23 are axially clamped together, the faces of forward portions 21 and 33 compress intermediate ring 5 to form seals between the faces and the surfaces of intermediate ring 5. Because the material of intermediate ring 5 is softer than the material of toroidal members 11 and 23, intermediate ring 5 will deform and tend to creep in generally axial directions. Inner ring 1 and outer ring 3, which are rigid, act to contain and prevent excessive radial creep of the soft material of intermediate ring 5, thereby maintaining the seal at the surfaces of intermediate ring 5 and minimizing or preventing leaks that might otherwise occur because of creep. The grooves in intermediate ring 5 and the ridges on the faces of forward portions 21 and 33 may have any other cross-sectional shapes such as, for example, pyramidal, square, or rectangular.

In other embodiments, intermediate ring 5 may have flat faces that are sealably contacted by raised ridges of any cross-sectional shape on the faces of forward portions 21 and 33 of toroidal members 11 and 23. In the fitting of FIGS. 3A and 4, either or both of inner ring 1 and outer ring 5 may function as axial stops to prevent over-tightening of the fitting and excess axial force applied by the faces of forward portions 21 and 33 of toroidal members 11 and 23 against intermediate ring 5.

Because intermediate ring 5 and inner ring 1 will be in contact with the fluid in the piping system that uses the fitting of FIGS. 3A and 4, the materials of these rings must be chemically compatible with the fluid.

Figure 3B:
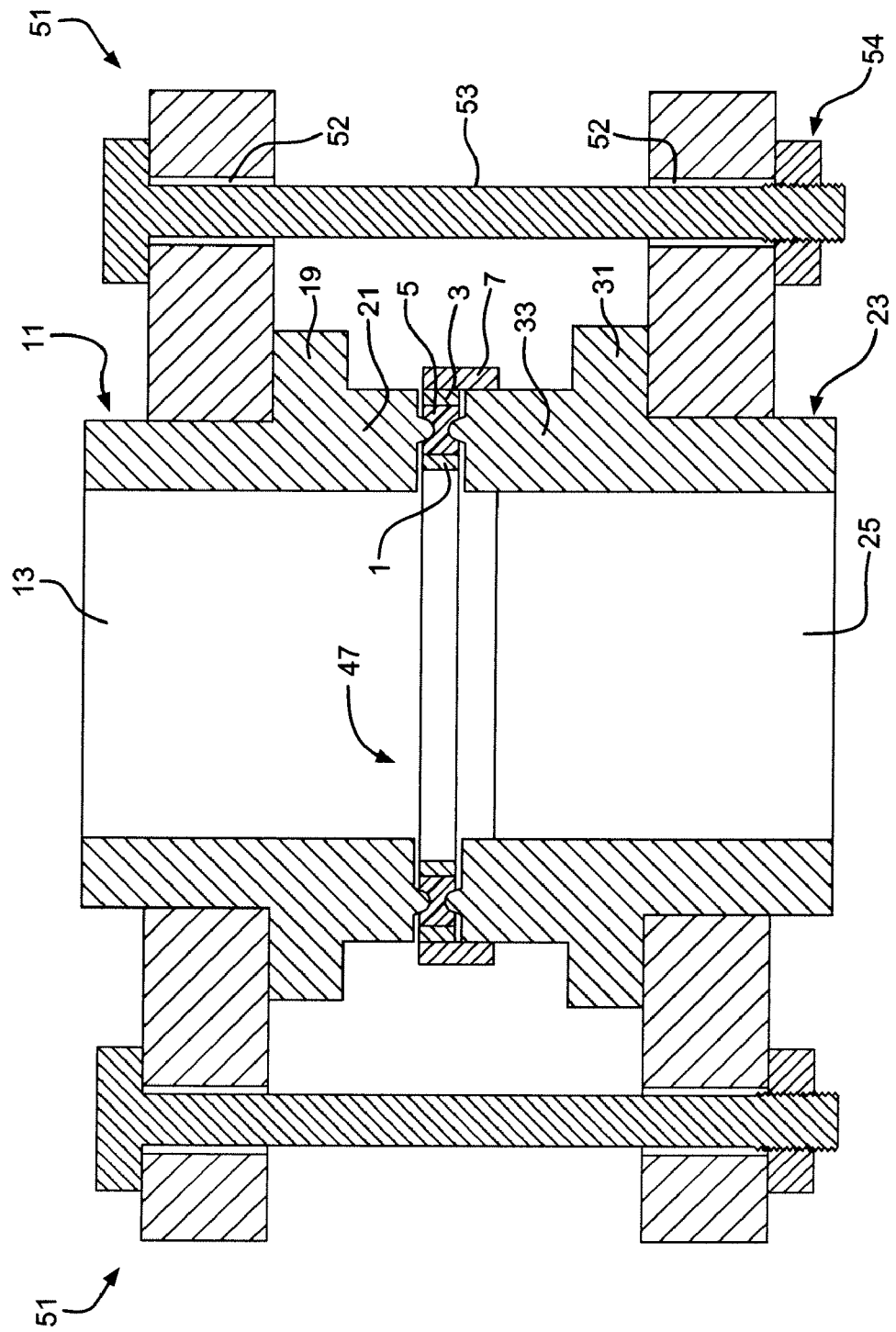

The gasket illustrated in FIGS. 1 and 2A to 2D may be used in any other type of threaded compression fitting that performs the same function as the compression fitting illustrated in FIGS. 3A and 4, namely, to exert opposing axial forces to press the faces of the fitting against the gasket to form a fluid-tight seal. Alternatively, as shown in FIG. 3B, the gasket illustrated in FIGS. 1 and 2A to 2D may be used with a flanged fitting 51 wherein each of the first and second toroidal members 11 and 23 has a flanged portion fitted with a plurality of bolt holes 52. A bolt 53 is inserted through each pair of bolt holes 52 in the respective flanges and the bolts are tightened by nuts 54 to force the faces of the first and second toroidal members 11 and 23 sealably against the intermediate ring of the gasket. Other types of devices may be used to force the faces of the toroidal members 11 and 23 axially against the intermediate ring of the gasket such as, for example, clamped flanges using split rings with cap screws, single-bolt or double bolt clamp-type split ring sanitary fittings, or cam and groove type couplings.

The gasket described above and the fluid fittings or couplings using the gasket are well-suited for systems that store and deliver toxic, reactive, and corrosive gases. Gases of this type are used in the manufacture of electronic components, for example, and the gases are usually required at very high purity. Such gases may include, for example, ultra-high purity ammonia, tungsten hexafluoride, hydrogen fluoride, and nitrogen triflouride. In the operation of storage and delivery systems for these gases, the need for leak-tight operation, high purity, and frequent assembly and disassembly of the fluid fitting may require that each gasket be used only once and then refurbished, remanufactured, or discarded.

The invention claimed is:

1. A gasket comprising
an inner ring having an outer surface,
an outer ring having an inner surface, and
an intermediate ring disposed between the inner ring and the outer ring,
wherein
the inner ring, the outer ring and the intermediate ring are coaxial rings (having a same axis);
the intermediate ring has an inner surface in contact with the outer surface of the inner ring along the axial direction and an outer surface in contact with the inner surface of the outer ring along the axial direction;
the intermediate ring has a first surface orthogonal to the inner surface and the outer surface and has a second surface generally parallel to the first surface, wherein at least one of the first surface and the second surface of the intermediate ring has a circular groove therein that is coaxial with the intermediate ring; and
the intermediate ring is made of a material that has a hardness less than the hardness of the material of each of the inner ring and the outer ring.

2. The gasket of claim 1 wherein the inner and outer rings are metal and the intermediate ring comprises an elastomeric material.

3. The gasket of claim 2 wherein the elastomeric material of the intermediate ring is selected from the group consisting of polychlorotetrafluoroethylene, polytetrafluoroethylene, polyamides, and ethylene propylene.

4. The gasket of claim 1 wherein the inner and outer rings are steel and the intermediate ring is a metal selected from the group consisting of copper, aluminum, tin, zinc, lead, and alloys thereof.

5. The gasket of claim 1 wherein the outer surface of the inner ring and/or the inner surface of the outer ring each has one or more grooves, and the inner and/or outer surfaces of the intermediate ring each have one or more raised ridges adapted to mate with the grooves in the inner surface of the outer ring and/or the outer surface of the inner ring, respectively.

6. The gasket of claim 1 wherein the inner and/or outer surfaces of the intermediate ring each has one or more grooves, and the outer surface of the inner ring and/or the inner surface of the outer ring each have one or more raised ridges adapted to mate with the grooves in the inner surface and/or the outer surface of the intermediate ring, respectively.

7. The gasket of claim 1 comprising a retainer ring having an inner surface in contact with an outer surface of the outer ring, wherein the retainer ring has an axial length that is greater than the axial length of the outer ring.

8. The gasket of claim 1 wherein the intermediate ring is held in place between the inner ring and the outer ring by a friction fit between the inner surface of the intermediate ring and the outer surface of the inner ring and a friction fit between the outer surface of the intermediate ring and the inner surface of the outer ring.

9. The gasket of claim 1 wherein the intermediate ring is held in place between the inner ring and the outer ring by an adhesive between the inner surface of the intermediate ring and the outer surface of the inner ring and an adhesive between the outer surface of the intermediate ring and the inner surface of the outer ring.

10. A fluid seal assembly comprising
(a) a gasket comprising an inner ring having an outer surface, an outer ring having an inner surface, and an intermediate ring disposed between the inner ring and the outer ring, wherein the inner ring, the outer ring and the intermediate ring are coaxial rings (having a same axis); the intermediate ring has an inner surface in contact with the outer surface of the inner ring along the axial direction and an outer surface in contact with the inner surface of the outer ring along the axial direction; the intermediate ring has a first surface orthogonal to the inner surface and the outer surface and has a second surface generally parallel to the first surface, wherein at least one of the first surface and the second surface of the intermediate ring has a circular groove therein that is coaxial with the intermediate ring; and the intermediate ring is made of a material that has a hardness less than the hardness of the material of each of the inner ring and the outer ring;
(b) a first toroidal member having an axis, a first end, a second end axially opposite the first end, an outer surface adjacent the first end, and a face at the first end generally orthogonal to the outer surface, and;

(c) a second toroidal member having an axis, a first end, a second end axially opposite the first end, an outer surface adjacent the first end, and a face at the first end generally orthogonal to the outer surface;

wherein the gasket is disposed coaxially between the face of the first toroidal member and the face of the second toroidal member such that the faces of the first and second toroidal members form a sealing contact with the first and second surfaces of the intermediate ring, respectively, and wherein the intermediate ring is made of a material that has a hardness that is less than the hardness of the material of the first toroidal member and less than the hardness of the material of the second toroidal member.

11. The fluid seal assembly of claim 10 comprising a retainer ring having an inner surface in contact with an outer surface of the outer ring, wherein the retainer ring has an axial length that is greater than the axial length of the outer ring.

12. The fluid seal assembly of claim 11 wherein the inner surface of the retainer ring is adjacent the outer surface of a first portion of the first toroidal member and/or adjacent the outer surface of a first portion of the second toroidal member, and wherein the retainer ring is adapted to ensure that the gasket is disposed coaxially with the first toroidal member and/or the second toroidal member.

13. The fluid seal assembly of claim 10 comprising
(1) a first coupling nut having an externally-threaded portion and a portion having an internal diameter greater than the external diameter of a portion of the first toroidal member adjacent the second end thereof, wherein the first coupling nut fits coaxially around the portion of the first toroidal member adjacent the second end thereof; and
(2) a second coupling nut having an internally-threaded portion and a portion having an internal diameter greater than the external diameter of a portion of the second toroidal member adjacent the second end thereof, wherein the second coupling nut fits coaxially around the portion of the first toroidal member adjacent the second end thereof;
wherein the first coupling nut and the second coupling nut are adapted to be threaded together to force the faces of the first and second toroidal members sealably against the intermediate ring of the gasket.

14. The fluid seal assembly of claim 10 wherein
(1) the first toroidal member comprises a flanged portion having an outer diameter greater than any outer diameter of any other portion of the first toroidal member; and
(2) the second toroidal member comprises a flanged portion having an outer diameter greater than any outer diameter of any other portion of the second toroidal member;
wherein the flanged portions of the first and second toroidal members are fitted with a plurality of bolt holes and bolts adapted to be threaded together to force the faces of the first and second toroidal members sealably against the intermediate ring of the gasket.

15. The fluid seal assembly of claim 14 comprising a retainer ring having an inner surface in contact with an outer surface of the outer ring, wherein the retainer ring has an axial length that is greater than the axial length of the outer ring.

16. The fluid seal assembly of claim 10 wherein the inner and outer rings of the gasket are metal and the intermediate ring of the gasket comprises an elastomeric material.

17. The fluid seal assembly of claim 10 wherein the elastomeric material of the intermediate ring is selected from the group consisting of polychlorotetrafluoroethylene, polytetrafluoroethylene, polyamides, and ethylene propylene.

18. The fluid seal assembly of claim 10 wherein the inner and outer rings of the gasket are steel and the intermediate ring of the gasket is a metal selected from the group consisting of copper, aluminum, tin, zinc, lead, and alloys thereof.

19. The fluid seal assembly of claim 10 wherein the intermediate ring has a first surface orthogonal to the inner surface and the outer surface and a second surface generally parallel to the first surface, wherein at least one of the first surface and the second surface of the intermediate ring has a circular groove therein that is coaxial with the intermediate ring.

20. The fluid seal assembly of claim 19 wherein at least one of the face of the first toroidal member and the face of the second toroidal member has a raised portion that is adapted to fit into the groove in the corresponding surface of the intermediate ring when the toroidal members and the intermediate ring are placed in sealable contact.

21. A fluid seal assembly comprising
(a) a gasket comprising an inner ring having an outer surface, an outer ring having an inner surface, and an intermediate ring disposed between the inner ring and the outer ring, wherein the inner ring, the outer ring and the intermediate ring are coaxial rings (having a same axis); the intermediate ring has an inner surface in contact with the outer surface of the inner ring along the axial direction and an outer surface in contact with the inner surface of the outer ring along the axial direction; and the intermediate ring is made of a material that has a hardness less than the hardness of the material of each of the inner ring and the outer ring;
(b) a first toroidal member having an axis, a first end, a second end axially opposite the first end, an outer surface adjacent the first end, and a face at the first end that is generally orthogonal to the outer surface; and
(c) a second toroidal member having an axis, a first end, a second end axially opposite the first end, an outer surface adjacent the first end, and a face at the first end that is generally orthogonal to the outer surface;
wherein the intermediate ring is made of a material that has a hardness that is less than the hardness of the material of the first toroidal member and less than the hardness of the material of the second toroidal member;
(d) a first coupling nut having an externally-threaded portion and a portion having an internal diameter greater than the external diameter of a portion of the first toroidal member adjacent the second end thereof, wherein the first coupling nut fits coaxially around the portion of the first toroidal member adjacent the second end thereof; and
(e) a second coupling nut having an internally-threaded portion and a portion having an internal diameter greater than the external diameter of a portion of the second toroidal member adjacent the second end thereof, wherein the second coupling nut fits coaxially around the portion of the first toroidal member adjacent the second end thereof;
wherein the gasket is disposed coaxially between the face of the first toroidal member and the face of the second toroidal member such that the faces of the first and second toroidal members are in respective sealing contact with the first and second surfaces of the intermediate ring, and wherein the first coupling nut and the second coupling nut are adapted to be threaded together to force the faces of the first and second toroidal members against the intermediate ring of the gasket.

22. The fluid seal assembly of claim 21 wherein the intermediate ring has a first surface orthogonal to the inner surface and the outer surface and a second surface generally parallel to the first surface, wherein the first surface and the second surface of the intermediate ring each has a circular groove therein that is coaxial with the intermediate ring.

23. The fluid seal assembly of claim 22 wherein the face of the first toroidal member and the face of the second toroidal member each has a raised portion that is adapted to fit into the groove in the corresponding surface of the intermediate ring when the toroidal members and the intermediate ring are placed in sealable contact.

* * * * *